United States Patent
Tamura et al.

(10) Patent No.: US 7,699,749 B2
(45) Date of Patent: Apr. 20, 2010

(54) POWERTRAIN CONTROL APPARATUS AND METHOD

(75) Inventors: Tadashi Tamura, Nishikamo-gun (JP); Akira Hino, Toyota (JP); Takashi Yumoto, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 437 days.

(21) Appl. No.: 11/716,699

(22) Filed: Mar. 12, 2007

(65) Prior Publication Data

US 2007/0213177 A1    Sep. 13, 2007

(30) Foreign Application Priority Data

Mar. 13, 2006  (JP) ............................. 2006-067516

(51) Int. Cl.
*F16H 61/00* (2006.01)
*F16H 61/14* (2006.01)
*B60W 10/02* (2006.01)
*B60W 10/04* (2006.01)
*G06F 7/00* (2006.01)
*G06F 17/00* (2006.01)

(52) U.S. Cl. .................. 477/174; 477/168; 477/180; 701/67; 701/68

(58) Field of Classification Search ............. 477/168, 477/174, 180; 701/51, 53, 54, 64, 67, 68, 701/101, 112, 115
See application file for complete search history.

(56) References Cited

U.S. PATENT DOCUMENTS

| 5,626,536 A * | 5/1997 | Kono et al. .................. 477/181 |
| 7,235,036 B2 * | 6/2007 | Takahashi .................... 477/174 |
| 7,324,886 B2 * | 1/2008 | Yumoto et al. ................ 701/67 |
| 2007/0180817 A1 * | 8/2007 | Yamashita et al. ............ 60/285 |

FOREIGN PATENT DOCUMENTS

| JP | 07-025269 A | 1/1995 |
| JP | 2001-263096 A | 9/2001 |
| JP | 2004-137963 A | 5/2004 |

* cited by examiner

*Primary Examiner*—Tisha D Lewis
(74) *Attorney, Agent, or Firm*—Sughrue Mion, PLLC

(57) ABSTRACT

A powertrain control apparatus that controls a powertrain including a lock-up clutch, which connects an engine, in which fuel supply may be cut off, directly to an automatic transmission. The control apparatus includes an output unit, a control unit, and a setting unit. The output unit outputs an instruction to lower engagement pressure for the lock-up clutch from a value at which the lock-up clutch is engaged to a value at which the lock-up clutch is disengaged. The control unit resumes the fuel supply to the engine when a predetermined lag time has elapsed since the instruction is output. The setting unit sets the lag time so that the lag time is shorter when a temperature of a combustion chamber of the engine is a first temperature than when the temperature of the combustion chamber of the engine is a second temperature which is higher than the first temperature.

14 Claims, 7 Drawing Sheets

POWERTRAIN CONTROL APPARATUS AND METHOD

INCORPORATION BY REFERENCE

The disclosure of Japanese Patent Application No. 2006-067516 filed on Mar. 13, 2006, including the specification, drawings and abstract, is incorporated herein by reference in its entirety.

BACKGROUND OF THE INVENTION

1. Field of the Invention

The invention relates to a powertrain control apparatus and method. More particularly, the invention relates to a powertrain that includes a lock-up clutch that connects an engine directly to an automatic transmission.

2. Field of the Invention

A conventional automatic transmission is connected to an engine via a fluid coupling such as a torque converter. The torque converter transmits the driving force to the transmission through the fluid (e.g., oil) that circulates in the torque converter. Therefore, the rotational speed of the input shaft of the torque converter differs from the rotational speed of the output shaft of the torque converter. This may decrease the efficiency of transmitting the driving force. Accordingly, a lock-up clutch that mechanically connects the input shaft to the output shaft of the torque converter is generally provided.

To improve fuel efficiency, when the vehicle speed is equal to or above a predetermined speed while the vehicle is decelerating, the fuel supply is cut off, that is, fuel injection is stopped. If the vehicle speed decreases to the predetermined speed while the fuel supply is cut off, the fuel injection resumes (i.e., the fuel supply resumes). After the fuel supply resumes, engine speed increases. Therefore, if the lock-up clutch is engaged when the fuel injection resumes, a shock may occur, and drivability may deteriorate, Accordingly, the powertrain is controlled so that the lock-up clutch is disengaged when the fuel supply resumes.

Japanese Patent Application Publication No. 2004-137963 (JP-A 2004-137963) describes a control apparatus for controlling a vehicle during deceleration, which resumes fuel injection after disengaging the lock-up clutch. The control apparatus described in JP-A2004-137963 controls a vehicle in which a lock-up clutch is controlled and fuel supply is cut off when the operation amount of an accelerator pedal is zero to decelerate the vehicle. The control apparatus includes a vehicle-speed detection portion, an accelerator-pedal operation amount detection portion, an initial-value setting portion, a disengagement lag-time measurement portion, a vehicle-speed change portion, a disengagement control portion, a disengagement confirmation portion, and a fuel-supply control portion. The vehicle-speed detection portion detects a vehicle speed. The accelerator-pedal operation amount detection portion detects the operation amount of an accelerator pedal. The initial-value setting portion sets in advance the initial value of a disengagement vehicle speed at which the lock-up clutch is disengaged, on the assumption that a disengagement lag time is long. The disengagement lag time is the lag time between when an instruction signal is output to disengage the lock-up clutch, and when the lock-up clutch is actually disengaged. The disengagement lag-time measurement portion measures the disengagement lag time, when the lock-up clutch is disengaged. The vehicle-speed change portion decreases the set disengagement vehicle speed based on the measured disengagement lag time. The disengagement control portion outputs the instruction signal to disengage the lock-up clutch when the operation amount of the accelerator pedal is zero, and the detected vehicle speed is lower than or equal to the set disengagement vehicle speed. The disengagement confirmation portion confirms whether the lock-up clutch is disengaged. The fuel-supply control portion resumes the fuel supply after the lock-up clutch is actually disengaged.

The described control apparatus sets the initial value of the disengagement vehicle speed on the assumption that the disengagement lag time is long, and decreases the set disengagement vehicle speed as the disengagement lag time decreases. This increases the range of vehicle speed in which the lock-up clutch is engaged when the operation amount of the accelerator pedal is zero. The control apparatus also stops the fuel supply cutoff when the lock-up clutch is actually disengaged. Therefore, it is possible to improve fuel efficiency, to avoid stalling the engine, and to avoid a shock when the fuel supply resumers regardless of the disengagement lag time.

Even if the time required to disengage the lock-up clutch is constant, after the fuel supply resumes, engine speed may increase quickly in some cases, and may not increase quickly in other cases. However, JP-A 2004-137963 focuses attention only on the time required to disengage the lock-up clutch. The time from when the fuel supply resumes until when the engine speed starts increasing is not considered. Therefore, when the fuel supply resumes after the lock-up clutch is actually disengaged as in JP-A 2004-137963, if the engine speed does not increase quickly after the fuel supply resumes, the engine speed may drop, which may cause the engine to stall.

SUMMARY OF THE INVENTION

The invention provides a powertrain control apparatus and method that suppresses a shock when fuel supply resumes, and suppresses an engine stall.

A first aspect of the invention relates to a powertrain control apparatus that includes a lock-up clutch that connects an engine, in which fuel supply is cut off, directly to an automatic transmission. The control apparatus includes an output unit, a control unit, and a setting unit. The output unit outputs an instruction to lower engagement pressure for the lock-up clutch from a value at which the lock-up clutch is engaged to a value at which the lock-up clutch is disengaged. The control unit resumes the fuel supply to the engine when a preset lag time has elapsed since the instruction is output. The setting unit sets the lag time so that the lag time is shorter when a temperature of a combustion chamber of the engine is a first temperature than when the temperature of the combustion chamber of the engine is a second temperature which is higher than the first temperature.

According to the first aspect of the invention, the lock-up clutch is brought to the disengaged state from the engaged state when the output unit outputs the instruction. However, there is a lag between the time the lock-up clutch is completely disengaged and when the process of disengaging the lock-up clutch starts. Therefore, the fuel supply to the engine resumes when the preset lag time has passed after the instruction is output. The time from when the fuel supply resumes until when the engine speed starts increasing varies depending on the temperature of the combustion chamber of the engine. When the temperature of the combustion chamber is low, the combustibility of fuel is low. Therefore, the time until when the engine speed starts increasing is long. When the temperature of the combustion chamber is high, the combustibility of fuel is high. Therefore, the time until when the engine speed starts increasing is short. Thus, the lag time between when the instruction is output, and when the fuel supply resumes is set so that the lag time is shorter when the temperature of the combustion chamber of the engine is the first temperature than when the temperature of the combustion chamber of the engine is the second temperature which is higher than the first temperature. For example, the lag time may be set based on the temperature of the coolant of the engine or the period of time over which the fuel supply is cut off. The lag time is set to decrease as the temperature of the coolant of the engine decreases. Alternatively, the lag time is set to decrease as the period of time over which the fuel supply is cut off increases. Thus, when the temperature of the combustion chamber of the engine is low and the period until the engine starts increasing is long, the engine is controlled so that the fuel supply resumes sooner. In contrast, when the temperature of the combustion chamber of the engine is high and the period until when the engine speed starts increasing is short, the engine is controlled so that the fuel supply resumes later. This reduces the deviation between the timing at which the lock-up clutch is actually disengaged, and the timing at which the engine speed starts increasing. As a result, it is possible to provide the powertrain control apparatus that suppresses a shock when the fuel supply resumes, and prevents the engine from stalling.

The powertrain control apparatus according to the second aspect of the invention is similar to the control apparatus according to the first aspect, except that the temperature of the combustion chamber that is determined based on the temperature of coolant of the engine.

According to the second aspect of the invention, the temperature of the coolant of the engine is used to determine the temperature of the combustion chamber. The temperature of the combustion chamber is correlated with the temperature of the coolant of the engine. Therefore, the lag time is set based on the temperature of the combustion chamber, that is, the lag time is set based on the time when the engine speed starts increasing, without directly measuring the temperature of the combustion chamber.

The powertrain control apparatus according to the third aspect of the invention is similar to the control apparatus according to the first aspect, except that the setting unit decreases the lag time as the temperature of the coolant decreases.

According to the third aspect of the invention, the lag time is set to decrease as the temperature of the coolant of the engine decreases. Thus, when the temperature of the combustion chamber of the engine is low and the time until the engine speed starts increasing is long, the engine is controlled so that the fuel supply resumes sooner. In contrast, when the temperature of the combustion chamber of the engine is high and the time until the engine speed starts increasing is short, the engine is controlled so that the fuel supply resumes later. This reduces the deviation between the timing at which the lock-up clutch is actually disengaged, and the timing at which the engine speed starts increasing. As a result, it is possible to provide the powertrain control apparatus, which suppresses a shock when the fuel supply resumes, and suppresses an engine stall.

The powertrain control apparatus according to the fourth aspect of the invention is similar to the control apparatus according to the first aspect, except that the temperature of the combustion chamber is determined based on the period of time over which the fuel supply is cut off in the engine.

According to the fourth aspect of the invention, the period of time over which the fuel supply is cut off in the engine is used to determine the temperature of the combustion chamber. The temperature of the combustion chamber is correlated with the period of time over which the fuel supply is cut off (i.e., the fuel injection is stopped). Therefore, the lag time is set based on the temperature of the combustion chamber, that is, based on the time when the engine speed starts increasing, without directly measuring the temperature of the combustion chamber.

The powertrain control apparatus according to the fifth aspect of the invention is similar to the control apparatus according to the fourth aspect, except that the setting unit decreases the lag time as the period of time over which the fuel supply is cut off increases.

According to the fifth aspect of the invention, the lag time is set to decrease as the period of time over which the fuel supply is cut off increases. Thus, when the temperature of the combustion chamber of the engine is low and the period until the engine starts increasing is long, the engine is controlled so that the fuel supply resumes sooner. In contrast, when the temperature of the combustion chamber of the engine is high, and the period until when the engine speed starts increasing is short, the engine is controlled so that the fuel supply resumes later. This reduces the deviation between the timing at which the lock-up clutch is actually disengaged, and the timing at which the engine speed starts increasing. As a result, it is possible to provide a powertrain control apparatus that suppresses a shock when the fuel supply resumes, and suppresses an engine stall.

BRIEF DESCRIPTION OF THE DRAWINGS

The foregoing and further objects, features, and advantages of the invention will become apparent from the following description of preferred embodiments with reference to the accompanying drawings, wherein like numerals are used to represent like elements and wherein.

DETAILED DESCRIPTION OF THE EXAMPLE EMBODIMENTS

Figure 1:
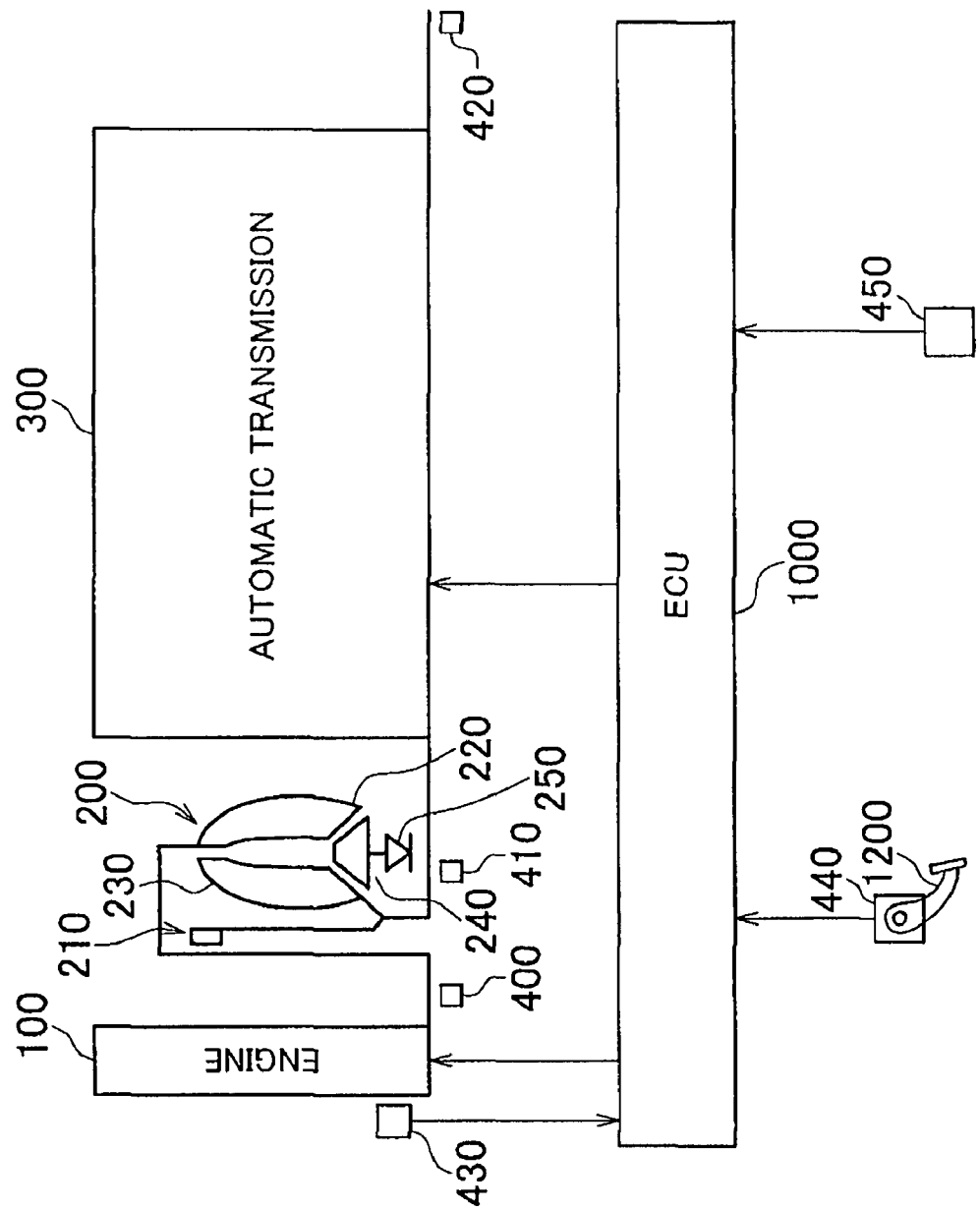
FIG. 1 is a schematic diagram showing the powertrain of a vehicle in which a control apparatus according to a first embodiment is provided.

Hereinafter, embodiments of the invention will be described in detail with reference to the drawings. In the following description, the same components are denoted by the same reference numerals, and have the same names and the same functions. Therefore, redundant description thereof will be omitted.

The powertrain of a vehicle in which a control apparatus according to a first embodiment of the invention is provided will be described with reference to FIG 1. The control apparatus according to the embodiment may be realized, for example, when an ECU (electronic control unit) 1000 shown in FIG. 1 executes programs.

As shown in FIG. 1, the powertrain of the vehicle includes an engine 100, a torque converter 200, an automatic transmission 300, and an ECU 1000.

The output shaft of the engine 100 is connected to the input shaft of the torque converter 200. That is, the engine 100 is connected to the torque convert 200 by the rotational shafts. Accordingly, the rotational speed NE of the output shaft of the engine 100 (i.e., engine speed NE) detected by an engine speed sensor 400 is equal to the rotational speed of the input shaft of the torque converter 200 (i.e., the rotational speed of a pump impeller).

The torque converter 200 includes a lock-up clutch 210 that directly connects the input shaft to the output shaft; the pump impeller 220 on the input-shaft side; a turbine runner 230 on the output-shaft side; and a stator 240 that includes a one-way clutch 250, and that amplifies torque.

The torque converter 200 is connected to the automatic transmission 300 by the rotational shafts. A turbine speed sensor 410 detects the rotational speed NT of the output shaft of the torque converter 200 (i.e., the turbine speed NT). An output-shaft speed sensor 420 detects the rotational speed NOUT of the output shaft of the automatic transmission 300.

The automatic transmission 300 may be a transmission having a plurality of speeds, which includes a planetary gear unit. Alternatively, the automatic transmission 300 may be a continuously variable transmission that continuously changes the speed ratio.

The ECU 1000 receives a signal that indicates the engine speed NE from the engine speed sensor 400, a signal that indicates the turbine speed NT from the turbine speed sensor 410, a signal that indicates the rotational speed NOUT from the output-shaft speed sensor 420, a signal that indicates the temperature of coolant of the engine 100 from a coolant-temperature sensor 430, a signal that indicates the operation amount of an accelerator pedal 1200 from an accelerator-pedal operation amount sensor 440, and a signal that indicates a vehicle speed from a vehicle-speed sensor 450.

The ECU 1000 controls the engine 100, lock-up clutch 210, automatic transmission 300, and the like based on these signals.

Figure 4:
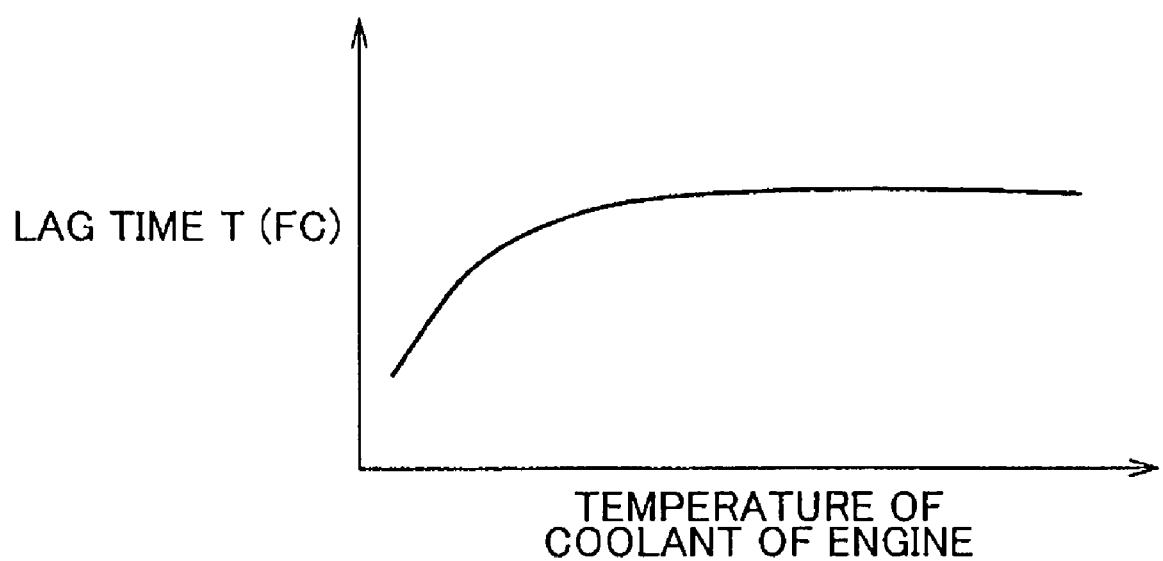
FIG. 4 is a diagram showing the relation between the temperature of coolant of an engine and a lag time T (FC)

A hydraulic circuit 500 will be described with reference to FIG. 2. The hydraulic circuit 500 regulates the hydraulic pressure supplied to the torque converter 200 to control the lock-up clutch 210. FIG. 4 shows only a part of the hydraulic circuit 500 that relates to the invention.

The hydraulic circuit 500 includes an oil pump 510, a primary regulator valve 520, a secondary regulator valve 530, a solenoid modulator valve 540, and a lock-up control valve 550.

The oil pump 510 is connected to the crankshaft of the engine 100. When the crankshaft rotates, the oil pump 510 draws automatic transmission fluid (ATF) accumulated in an oil pan 512, thereby generating hydraulic pressure. The primary regulator valve 520 regulates the hydraulic pressure generated by the oil pump 510, thereby generating line pressure.

The excess transmission fluid discharged from the primary regulator valve 520 flows into the secondary regulator valve 530. The secondary regulator valve 530 generates secondary pressure.

The solenoid modulator valve 540 generates solenoid-modulator pressure using the line pressure as the original pressure. The solenoid-modulator pressure is supplied to a duty solenoid 560.

A lock-up control valve 550 selectively supplies the secondary pressure to the engagement-side oil chamber of the torque converter 200 (i.e., the oil chamber on the pump impeller 220-side), or the disengagement-side oil chamber of the torque converter 200 (I.e., the space defined by the lock-up clutch 210 and a converter cover 260).

The lock-up control valve 550 operates using the hydraulic pressure supplied from the duty solenoid 560 as pilot pressure. When the hydraulic pressure is not supplied to the lock-up control valve 550 from the duty solenoid 560, the spool of the lock-up control valve 550 is in the position shown on the left side (1) in FIG. 2.

In this case, the secondary pressure is supplied to the disengagement-side oil chamber of the torque converter 200, and the hydraulic pressure in the engagement-side oil chamber of the torque converter 200 is supplied to an oil cooler (not shown). As a result, the lock-up clutch 210 is separated from the converter cover 260, and the lock-up clutch 210 is disengaged.

Figure 2:
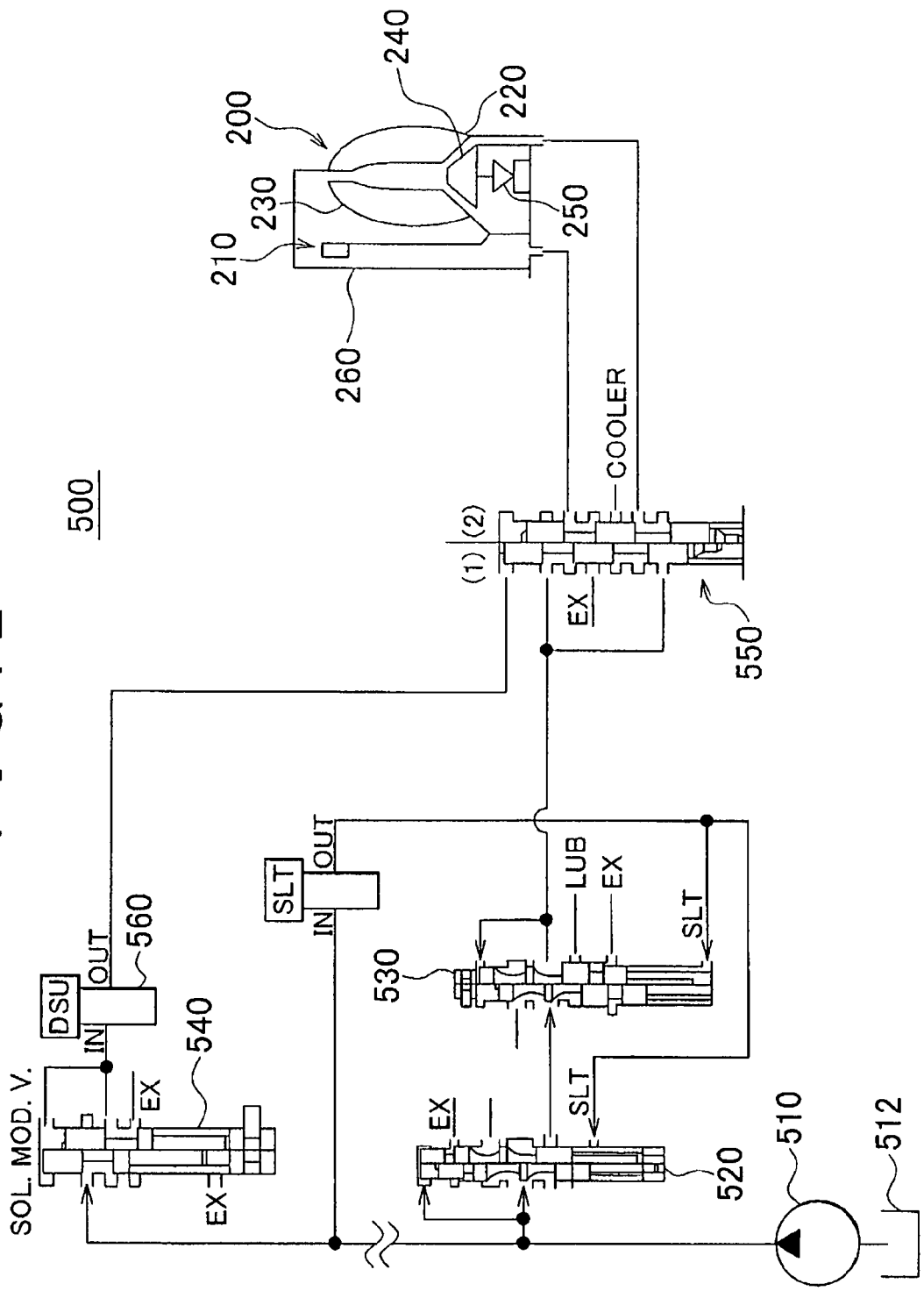
FIG. 2 is a diagram showing a hydraulic circuit that regulates hydraulic pressure supplied to a torque converter to control a lock-up clutch.

When the hydraulic pressure is supplied to the lock-up control valve 550 from the duty solenoid 560, the spool of the lock-up control valve 550 is in the position shown on the right side (2) in FIG. 2.

In this case, the secondary pressure is supplied to the engagement-side oil chamber of the torque converter 200, and the hydraulic pressure is drained from the disengagent-side oil chamber of the torque converter 200. As a result, the lock-up clutch 210 is pressed to the converter cover 260, and the lock-up clutch 210 is engaged.

The engagement pressure for the lock-up clutch 210 (i.e., the hydraulic pressure that engages the lock-up clutch 210) changes according to the difference in hydraulic pressure between the engagement-side oil chamber and the disengagement-side oil chamber in the torque converter 200.

The difference in hydraulic pressure between the engagement-side oil chamber and the disengagement-side oil chamber changes according to the hydraulic pressure supplied to the lock-up control valve 550 from the duty solehoid 560.

The duty solenoid 560 outputs the pressure according to an instruction duty value transmitted from the ECU 1000. Accordingly, the engagement pressure for the lock-up clutch 210 is controlled by the instruction duty value supplied to the duty solenoid 560. However, the method of controlling the engagement pressure for the lock-up clutch 210 is not limited to this method.

The control structure of a program executed by the ECU 1000 that is the control apparatus according to the embodiment will be described with reference to FIG. 3.

In step S100, the ECU 1000 determines whether the condition for cutting off fuel supply is satisfied. The condition for cutting off the fuel supply may be satisfied, for example, when the vehicle speed is higher than a threshold value, and the operation amount of the accelerator pedal is "0" (the engine 100 is idling). If the condition is satisfied (YES in step S100), the routine proceeds to step S110. If the condition is not satisfied (NO in step S100), the routine ends. In step S110, the ECU 1000 cuts off the fuel supply.

In step S200, the ECU 1000 determines whether the condition for resuming the fuel supply is satisfied. The condition for resuming the fuel supply may be satisfied, for example, when the vehicle speed is lower than or equal to the threshold value. If the condition for resuming the fuel supply is satisfied (YES in step S200), the routine proceeds to step S300. If the condition for resuming the fuel supply is not satisfied (NO in step S200), the routine returns to S200.

In step S300, the ECU 1000 sets a lag time T (FC) based on the temperature of the coolant of the engine 100. As shown in the map in FIG. 4, the lag time T (FC) is set to decrease as the temperature of the coolant decreases.

Figure 3:
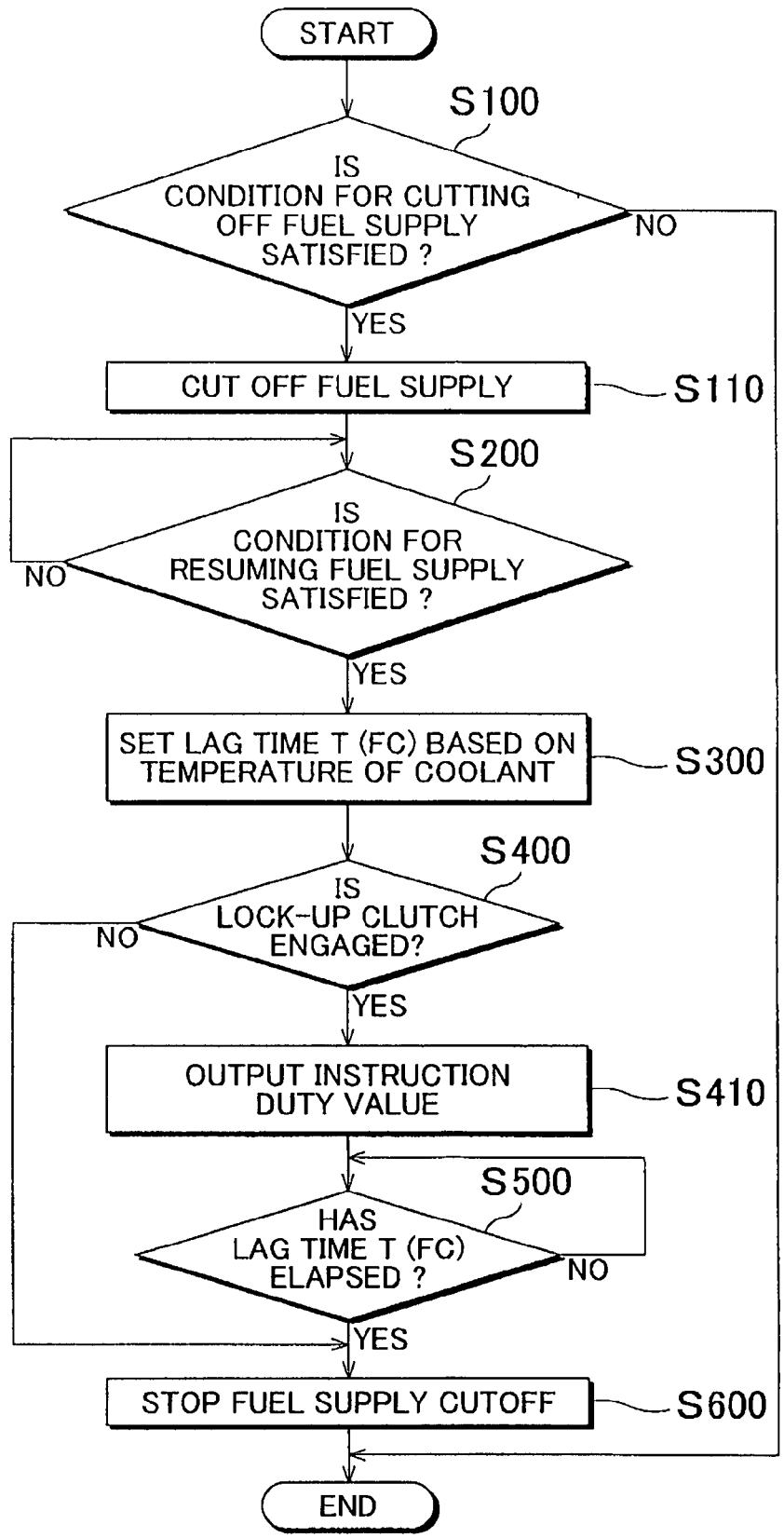
FIG. 3 is a flowchart showing the control structure of a program executed by an ECU that is the control apparatus according to the first embodiment.

As shown in FIG. 3, in step S400, the ECU 1000 determines whether the lock-up clutch 210 is engaged, for example, based on whether the difference between the engine speed NE and the turbine speed NT is smaller than or equal to a threshold value. If it is determined that the lock-up clutch 210 is engaged (YES in step S400), the routine proceeds to step S410. If it is determined that the lock-up clutch 210 is not engaged (NO in step S400), the routine proceeds to step S600.

In step S410, the ECU 1000 outputs the instruction duty value to decrease the engagement pressure for the lock-up clutch 210 (i.e., the difference in hydraulic pressure between the engagement-side oil chamber and the disengagement-side oil chamber) from a first hydraulic pressure, at which the lock-up clutch 210 engages, to a second hydraulic pressure, at which the lock-up clutch 210 disengages. That is, the ECU 1000 outputs the instruction to disengage the lock-up clutch 210. Thus, the process of disengaging the lock-up clutch 210 starts.

In step S500, the ECU 1000 outputs the instruction duty value to decrease the engagement pressure for the lock-up clutch 210 from the first hydraulic pressure to the second hydraulic pressure. Then, the ECU 1000 determines whether the lag time T (FC) has elapsed. If the lag time T (FC) has elapsed (YES in step S500), the routine proceeds to step S600. If the lag time T (FC) has not elapsed (NO in step S500), the routine returns to step S500.

In step S600, the ECU 1000 stops the fuel supply cutoff, that is, resumes the fuel injection.

The operation of the ECU 1000 based on the above-described structure and flowchart will be described. The ECU 1000 is the control apparatus according to the embodiment.

If the condition for cutting off the fuel supply when the vehicle is moving is satisfied, for example, when the vehicle is decelerating (YES in step S100), the fuel supply is cut off (S110). Then, if the condition for resuming the fuel supply is satisfied (YES in step S200), the fuel supply resumes eventually.

After the fuel supply cutoff is stopped (i.e., the fuel injection resumes) the engine speed NE increases. If the lock-up clutch 210 is engaged when the engine speed NE increases, a shock occurs. Accordingly, it is desirable to resume the fuel supply when the lock-up clutch 210 is disengaged.

It takes time to completely disengage the lock-up clutch 210 after the process of disengaging the lock-up clutch 210 starts. Therefore, the fuel supply cutoff stops when the predetermined lag time T (FC) has elapsed once the process of disengaging the lock-up clutch 210 starts.

The engine speed NE does not always start increasing at the same timing after the fuel supply cutoff is stopped and the fuel injection resumes. For example, when the temperature of the coolant of the engine 100 is low, the temperature of the combustion chamber of the engine 100 is low, which correlates with low combustibility of the fuel. Therefore, when the temperature of the coolant of the engine 100 is low, the time from when the fuel supply cutoff is stopped until the engine speed NE starts to increase is long, as compared to when the temperature of the coolant is high.

Accordingly, when the temperature of the coolant of the engine 100 is low, if the lag time T (FC) is set to the same value as when the temperature of the coolant is high, the engine speed NE does not increase, and the lock-up clutch 210 remains disengaged for a long time. Therefore, the engine speed NE may greatly drop before the engine speed NE starts to increase. As a result, the engine 100 may stall.

Thus, the lag time T (FC) is set to decrease as the temperature of the coolant of the engine 100 decreases (S300). If the lock-up clutch 210 is engaged (YES in step S400), the instruction duty value is output to decrease the engagement pressure for the lock-up clutch 210 from the first hydraulic pressure to the second hydraulic pressure ed (S410).

Figure 5:
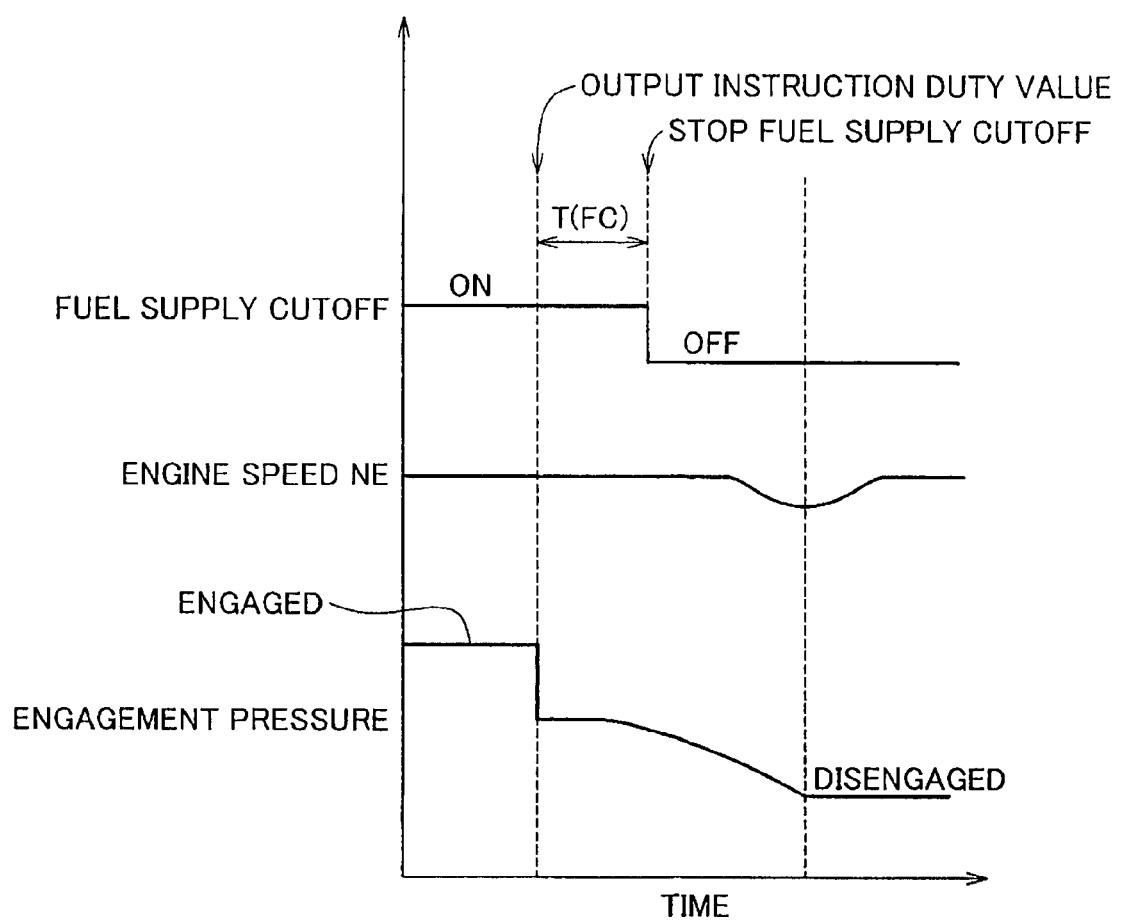
FIG. 5 is a timing chart showing the change in engine speed NE.

As shown in FIG. 5, after the lag time T (FC) has elapsed after the instruction duty value is output to disengage the lock-up clutch 210 (YES in step S500), the fuel supply cutoff is stopped (S600).

The lag time T (FC) is set to decrease as the temperature of the coolant of the engine 100 decreases. This reduces the deviation between the timing at which the lock-up clutch 210 is disengaged, and the timing at which the engine speed NE starts increasing.

As described above, the ECU that is the control apparatus according to the embodiment sets the lag time T (FC) such that the lag time T (FC) decreases as the temperature of the coolant of the engine decreases. When the lag time T (FC) after the instruction duty value is output to disengage the lock-up clutch 210 has elapsed, the fuel supply cutoff is stopped, and the fuel injection resumes. This reduces the deviation between the timing at which the lock-up clutch is disengaged, and the timing at which the engine speed NE starts increasing. Thus, a shock can be suppressed when the fuel supply resumes. In addition, the engine is less likely to stall.

Hereinafter, a second embodiment of the invention will be described. The second embodiment differs from the first embodiment in that the lag time T (FC) is set based on the period of time over which the fuel supply is cut off (hereinafter, referred to as "fuel-cutoff period"), instead of the temperature of the coolant of the engine 100. Other portions of the structure are the same as those in the first embodiment. The functions thereof are the same as in the first embodiment. Accordingly, the detailed description thereof will be omitted.

Figure 6:
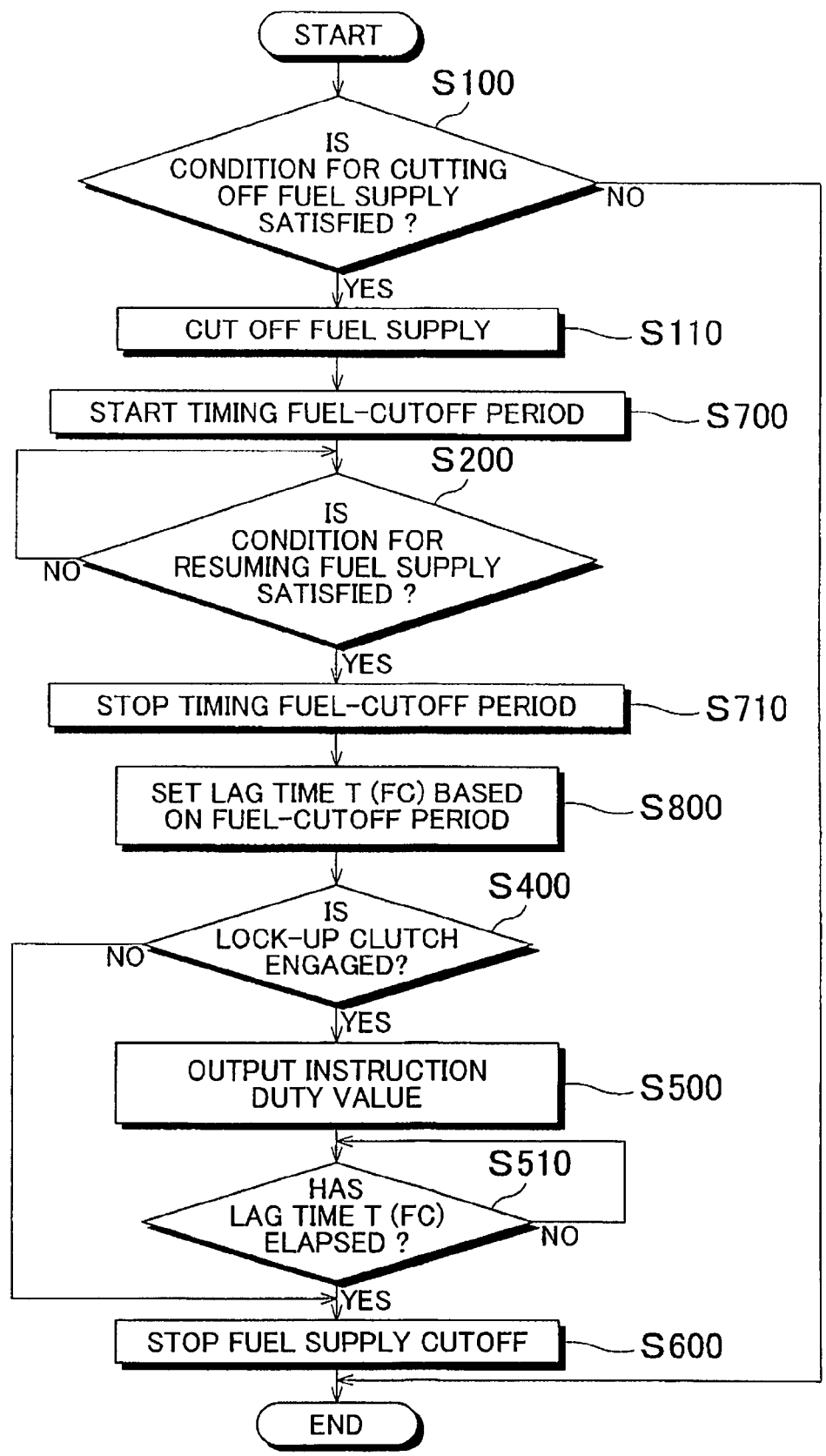
FIG. 6 is a flowchart showing the control structure of a program executed by the ECU that is a control apparatus according to a second embodiment.

The control structure of a program executed by the ECU 1000 that is the control apparatus according to the embodiment will be described with reference to FIG. 6. The same processes as in the first embodiment are denoted by the same step numbers. Therefore, the detailed description thereof will be omitted.

In step S700, the ECU 1000 starts timing the fuel-cutoff period. In step S710, the ECU 1000 stops timing the fuel-cutoff period.

Figure 7:
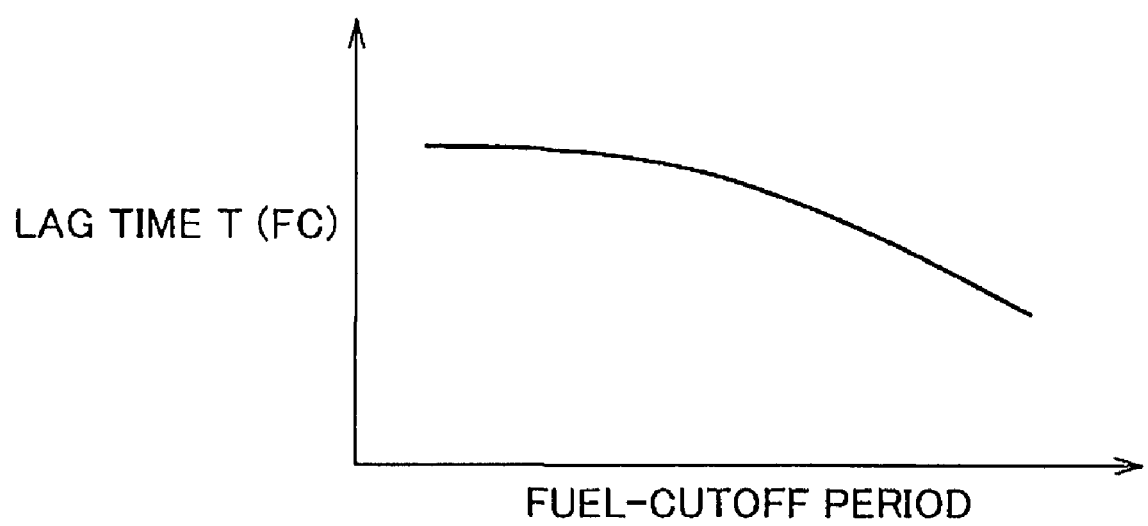
FIG. 7 is a diagram showing the relation between a fuel-cutoff period and the lag time T (FC).

In step S800, the ECU sets the lag time T (FC) based on the fuel-cutoff period. As shown in the map in FIG. 7, the lag time T (FC) is set to decrease as the fuel-cutoff period increases.

The operation of the ECU 1000 based on the above-described structure and flowchart will be described. The ECU 1000 is the control apparatus according to the embodiment.

As described above, the temperature of the combustion chamber of the engine 100 decreases as the temperature of the coolant of the engine 100 decreases. Also, the temperature of the combustion chamber decreases as the fuel-cutoff period increases. Thus, when the fuel supply is cut off (S110), the ECU 1000 starts timing the fuel-cutoff period (step S700). When the condition for resuming the fuel supply is satisfied (YES in step S200), the ECU 1000 stops timing the fuel-cutoff period (S710).

The lag time T (FC) is set to decrease as the elapsed period increases (S800). Thus, it is possible to obtain the same effects as those obtained in the first embodiment.

The lag time T (FC) may also be set based the temperature of the combustion chamber. In such an embodiment, a temperature sensor may be fitted to the combustion chamber of the engine 100 to detect the temperature of the combustion chamber. In this case, the lag time T (FC) is set based on the temperature of the combustion chamber detected by this temperature sensor. Accordingly, the lag time T (FC) is set to decrease as the temperature of the combustion chamber decreases.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A control apparatus for a power train that includes a lock-up clutch that directly connects an engine, in which fuel supply is cut off, to an automatic transmission, comprising:
an output unit that outputs an instruction to lower engagement pressure for the lock-up clutch from a value at which the lock-up clutch is engaged to a value at which the lock-up clutch is disengaged,
a control unit that resumes the fuel supply to the engine when a preset lag time has elapsed since the instruction is output; and
a setting unit that sets the lag time so that the lag time is shorter when a temperature of a combustion chamber of the engine is a first temperature than when the temperature of the combustion chamber of the engine is a second temperature which is higher than the first temperature.

2. The powertrain control apparatus according to claim 1, further comprising:
a temperature detecting unit that detects the temperature of the combustion chamber, and wherein the setting unit decreases the lag time as the detected temperature of the combustion chamber decreases.

3. The powertrain control apparatus according to claim 1, wherein the temperature of the combustion chamber is determined based on a value relating to the temperature of the combustion chamber.

4. The powertrain control apparatus according to claim 3, wherein the value relating to the temperature of the combustion chamber is a temperature of coolant of the engine.

5. The powertrain control apparatus according to claim 4, wherein the setting unit decreases the lag time as the temperature of the coolant decreases.

6. The powertrain control apparatus according to claim 3, wherein the value relating to the temperature of the combustion chamber is a period of time over which the fuel supply is cut off in the engine.

7. The powertrain control apparatus according to claim 6, wherein the setting unit decreases the lag time as the period over which the fuel supply is cut off increases.

8. A method of controlling a powertrain that includes a lock-up clutch connecting an engine, in which fuel supply is cut off, directly to an automatic transmission, comprising:
outputting an instruction to lower engagement pressure for the lock-up clutch from a value at which the lock-up clutch is engaged to a value at which the lock-up clutch is disengaged,
restoring the fuel supply to the engine after a preset lag time has elapsed after the instruction is output; and
setting the lag time so that the lag time is shorter when a temperature of a combustion chamber is a first temperature than when the temperature of the combustion chamber is a second temperature which is higher than the first temperature.

9. The method according to claim 8, further comprising:
detecting the temperature of the combustion chamber, wherein the lag time is decreased as the detected temperature of the combustion chamber decreases.

10. The method according to claim 8, further comprising:
determining the temperature of the combustion chamber based on a value relating to the temperature of the combustion chamber.

11. The method according to claim 10, wherein the value relating to the temperature of the combustion chamber is a temperature of coolant of the engine.

12. The method according to claim 11, wherein the lag time is decreased as the temperature of the coolant decreases.

13. The method according to claim 10, wherein the value relating to the temperature of the combustion chamber is a period of time over which the fuel supply is cut off in the engine.

14. The method according to claim 13, wherein the lag time is decreased as the period over which the fuel supply is cut off increases.

* * * * *